United States Patent
Adams et al.

(10) Patent No.: US 9,411,630 B1
(45) Date of Patent: *Aug. 9, 2016

(54) REDUCING VIRTUAL MACHINE PRE-EMPTION IN VIRTUALIZED ENVIRONMENT

(71) Applicant: International Business Machines Corporation, Armonk, NY (US)

(72) Inventors: Kevin S. Adams, Endicott, NY (US); Mark J. Lorenc, Endwell, NY (US); Donald W. Schmidt, Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,541

(22) Filed: Sep. 14, 2015

Related U.S. Application Data

(63) Continuation of application No. 14/642,947, filed on Mar. 10, 2015.

(51) Int. Cl.
*G06F 9/455* (2006.01)

(52) U.S. Cl.
CPC .... *G06F 9/45558* (2013.01); *G06F 2009/4557* (2013.01); *G06F 2009/45575* (2013.01)

(58) Field of Classification Search
CPC ............... G06F 2009/4557; G06F 2009/45575
USPC ............................................................ 718/1
See application file for complete search history.

(56) References Cited

U.S. PATENT DOCUMENTS

| 6,438,704 | B1* | 8/2002 | Harris | G06F 9/4881 710/58 |
|---|---|---|---|---|
| 8,799,908 | B2* | 8/2014 | Arges | G06F 9/5077 710/200 |
| 2009/0307439 | A1* | 12/2009 | Jacobs | G06F 11/0712 711/153 |
| 2010/0031254 | A1* | 2/2010 | Chin | G06F 9/45533 718/1 |
| 2013/0347000 | A1* | 12/2013 | Inoue | G06F 9/505 718/105 |

OTHER PUBLICATIONS

List of IBM Patents or Patent Applications Treated as Related; (Appendix P), Filed Mar. 10, 2015; 2 pages.
Kevin S. Adams et al., "Reducing Virtual Machine Pre-Emption in Virtualized Environment", U.S. Appl. No. 14/642,947, filed Mar. 10, 2015.

* cited by examiner

*Primary Examiner* — Qing Chen
*Assistant Examiner* — Clint Thatcher
(74) *Attorney, Agent, or Firm* — Cantor Colburn LLP; Joseph Petrokaitis

(57) ABSTRACT

A method for reducing virtual machine preemption in a virtualized environment is provided. The method includes dispatching a virtual central processing unit (CPU) to run in an emulation mode on a real CPU until the real CPU exits the emulation mode, determining whether the virtual CPU has loaded a wait state, determining whether a remaining time slice of the virtual CPU as a result of the dispatching is below a predefined threshold in an event that the virtual CPU has loaded the wait state and rescheduling the virtual CPU with a full time slice in an event the remaining time slice of the virtual CPU is below the predefined threshold.

5 Claims, 5 Drawing Sheets

REDUCING VIRTUAL MACHINE PRE-EMPTION IN VIRTUALIZED ENVIRONMENT

DOMESTIC PRIORITY

This application is a continuation of U.S. application Ser. No. 14/642,947, which was filed Mar. 10, 2015. The entire disclosures of U.S. application Ser. No. 14/642,947 are incorporated herein by reference.

BACKGROUND

The present invention relates to reducing virtual machine pre-emption and, more specifically, to a method for reducing virtual machine pre-emption in a virtualized environment.

Multiprocessing computing systems are often built as a set of similar processors all using the same physical memory. This arrangement is generally referred to as symmetric multiprocessing (SMP). An operating system running on such hardware system uses the processors in tandem to run the aggregate work of the system. For example, when the operating system is a Linux system, the Linux kernel dispatches user execution contexts, called processes, on the real processors of the system. Similarly, when the operating system is a z/VM® system, the z/VM® kernel dispatches its execution contexts, called virtual processors, on the real processors of the system. Windows®, another multiprocessor-capable processor operating system, operates similarly with its processes and processors. (z/VM® is a registered trademark of International Business Machines Corporation, of Armonk, N.Y., USA, and Windows® is a registered trademark of Microsoft Corporation, of Redmond, Wash., USA.)

In operating systems such as Linux, z/VM®, or Windows®, processor time is consumed either by user application execution contexts or by the operating system kernel. Such consumption is interleaved. The typical behavior is that a user process will first run for a period of time thus accruing processor time. Then, the user process will perform an operation or invoke an application programming interface (API) that will require the operating system kernel to intervene. The kernel intervenes to handle the condition, and it runs for a period of time, thus accruing processor time. When the kernel finishes handling the condition, the kernel returns control to the user application process.

Generally, the operating system kernel having to intervene requires the kernel to obtain serialization or mutual exclusion before handling the request. Such protection is required to assure that only one thread or processor at a time reads or updates the accessed kernel data structure(s). While lightweight serialization techniques are available in the literature, ultimately, all such techniques accomplish the same thing, namely, one-at-a-time access to these key data structure(s). The serial access is required to assure system integrity.

SUMMARY

According to one embodiment of the present invention, a method for reducing virtual machine preemption in a virtualized environment is provided. The method includes dispatching a virtual central processing unit (CPU) to run in an emulation mode on a real CPU until the real CPU exits the emulation mode, determining whether the virtual CPU has loaded a wait state, determining whether a remaining time slice of the virtual CPU as a result of the dispatching is below a predefined threshold in an event that the virtual CPU has loaded the wait state and rescheduling the virtual CPU with a full time slice in an event the remaining time slice of the virtual CPU is below the predefined threshold.

According to another embodiment of the present invention, a computer program product for reducing virtual machine preemption in a virtualized environment is provided. The computer program product includes a computer readable storage medium having program instructions embodied therewith, wherein the computer readable storage medium is not a signal, the program instructions readable by a processor to cause the processor to perform a method. The method includes dispatching a virtual central processing unit (CPU) to run in an emulation mode on a real CPU until the real CPU exits the emulation mode, determining whether the virtual CPU has loaded a wait state, determining whether a remaining time slice of the virtual CPU as a result of the dispatching is below a predefined threshold in an event that the virtual CPU has loaded the wait state and rescheduling the virtual CPU with a full time slice in an event the remaining time slice of the virtual CPU is below the predefined threshold.

According to yet another embodiment of the present invention, a computing system configured to execute a reduction of virtual machine preemption in a virtualized environment is provided. The computing system includes a processor and memory and the processor is configured to dispatch a virtual central processing unit (CPU) to run in an emulation mode on a real CPU until the real CPU exits the emulation mode, to determine whether the virtual CPU has loaded a wait state, to determine whether a remaining time slice of the virtual CPU as a result of the dispatching is below a predefined threshold in an event that the virtual CPU has loaded the wait state and to reschedule the virtual CPU with a full time slice in an event the remaining time slice of the virtual CPU is below the predefined threshold.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

A method for reducing virtual machine preemption in a virtualized environment is provided. The method includes dispatching a virtual central processing unit (CPU) to run in an emulation mode on a real CPU until the real CPU exits the emulation mode, determining whether the virtual CPU has loaded a wait state, determining whether a remaining time slice of the virtual CPU as a result of the dispatching is below a predefined threshold in an event that the virtual CPU has loaded the wait state and rescheduling the virtual CPU with a full time slice in an event the remaining time slice of the virtual CPU is below the predefined threshold.

An operating system kernel intervening in response to a user process performing an operation or invoking an API typically requires the kernel to obtain serialization or mutual exclusion before handling an application process request. Such protection is required to ensure that only one thread or processor at a time reads or updates an accessed kernel data structure(s). Ultimately, such techniques accomplish the same thing, that is, one-at-a-time access to key kernel data structures to ensure system integrity.

Factors in determining the amount of serialization or mutual exclusion a system experiences include the number of processors competing for serialization, the tendency of user application processes to require service from the operating system kernel and the frequency at which user applications require service from the operating system kernel. It follows then, that if the kernel can reduce the rate of user processes requiring service from the kernel, then it can reduce serialization overhead in the kernel.

Before describing various automated processes for facilitating such system efficiency (in accordance with one or more aspects of the present invention), examples of data processing systems which may utilize the facilities disclosed herein are discussed below with reference to FIGS. 1-2.

Figure 1:
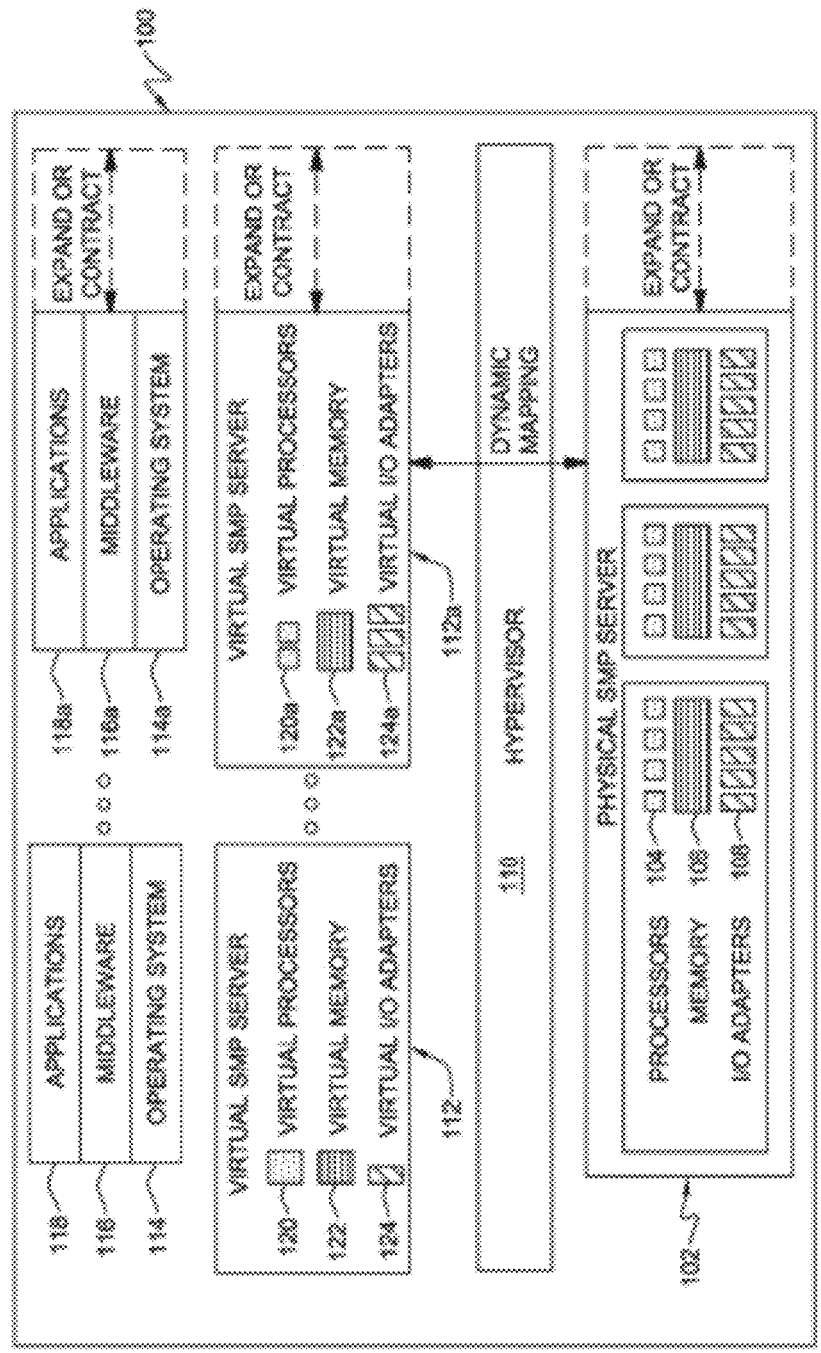
FIG. 1 is a block diagram of one embodiment of a data processing system to implement one or more aspects of the present invention.

FIG. 1 is a block diagram of a data processing or computer system 100, which in one example is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processors 104, memory 106 and I/O adapters 108. These physical devices are managed by hypervisor 110. Processors 104 are shared processors and each may be a simultaneous multithreading (SMT)-capable processor that is capable of concurrently executing multiple different threads on the processor.

A virtual server is a proxy for a physical server that has the same capabilities, interfaces and state. Virtual servers are created and managed by the hypervisor that resides on physical SMP server computer system 100. A virtual server appears to be a physical SMP server to its user: the operating system, middleware and application software that run upon it. SMP server computer system 100 includes one or more virtual servers such as virtual server 112 and virtual server 112a.

Each virtual server appears to its software to include its own processor(s), memory and I/O adapter(s) that are available for the exclusive use of that virtual server. For example, virtual server 112 includes a virtual processor 120, virtual memory 122 and virtual I/O adapters 124. Virtual server 112a includes virtual processors 120a, virtual memory 122a and virtual I/O adapters 124a.

Each virtual server supports its own software environment, including an operating system, middleware and applications. The software environment of each virtual server can be different from the software environment of other virtual servers. For example, the operating systems executed by each virtual server may differ from one another.

For example, virtual server 112 supports operating system 114, middleware 116 and applications 118. Virtual server 112a supports operating system 114a, middleware 116a and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory and virtual I/O adapters that are defined for each virtual server are logical substitutes for physical processors, memory and I/O adapters.

Hypervisor 110 manages the mapping between the virtual servers with their virtual processors, virtual memory and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the virtual servers' virtual processors by interleaving the execution of virtual processors on physical processors 104. In order to prevent a virtual processor from monopolizing a physical processor, the hypervisor 110 sets a dispatch time slice of a particular length of time. During each dispatch time slice, the hypervisor 110 will allocate, or assign, the physical processor 104 to a virtual processor and the physical processor will execute instructions for the virtual processor. This dispatch time slice limits the maximum amount of time a virtual processor may execute on a physical processor before the hypervisor resumes execution on the physical processor and might choose to dispatch a different virtual processor.

The hypervisor 110 is responsible for dynamically creating, managing and destroying virtual SMP servers. That is, whole virtual processors, virtual I/O adapters and virtual memory blocks can be removed or added by the hypervisor 110. The hypervisor 110 is also responsible for dynamic resource allocation, managing time-sharing of physical resources and altering the physical resource mapped to a processor without involving the operating system. Additionally, the hypervisor 110 is able to dedicate physical resources to virtual resources for situations where sharing is not desired. The hypervisor 110 is responsible for managing the addition or removal of physical resources and makes these additions and deletions transparent to the upper level user applications.

Figure 2:
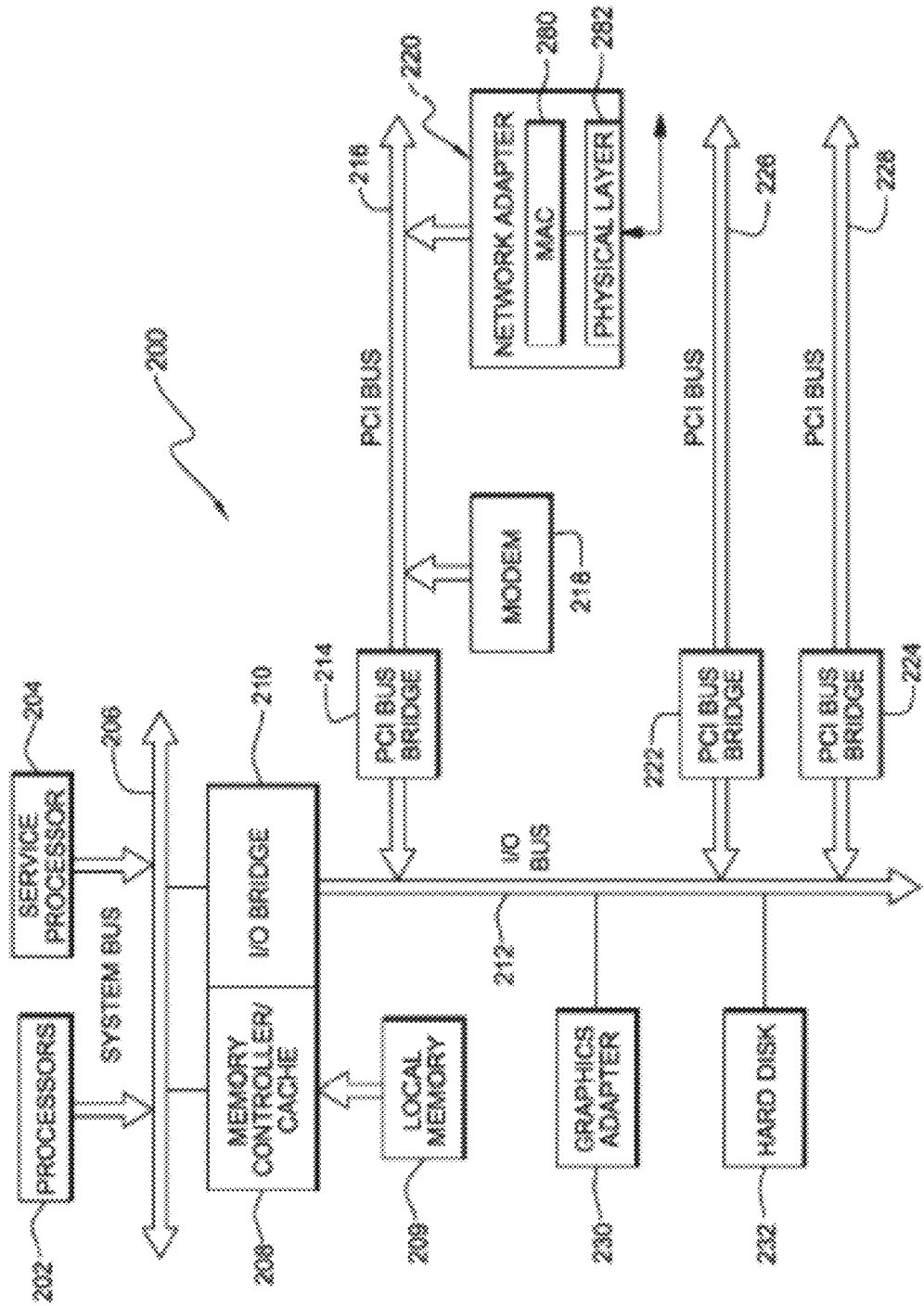
FIG. 2 is a more detailed illustration of one embodiment of a data processing system to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. In the depicted example, processor 204 is a service processor. Each SMT-capable processor is capable of concurrently executing multiple hardware threads on the one processor.

Also connected to system bus 206 is memory controller/cache 208, which provides an interface to local memory 209. The I/O bus bridge 210 is connected to system bus 206 and provides an interface to the I/O bus 212. The memory controller/cache 208 and the I/O bus bridge 210 may be integrated as depicted.

Peripheral component interconnect (PCI) bus bridge 214 is connected to I/O bus 212 and provides an interface to PCI local bus 216. A number of modems may be connected to the PCI bus 216. Typical PCI bus implementations will support four PCI expansion slots or add-in connectors. Communications links to network computers may be provided through modem 218 and network adapter 220 connected to PCI local bus 216 through add-in boards.

Network adapter 220 includes a physical layer 282 which conditions analog signals to go out to the network, such as, for example, an Ethernet network for an R45 connector. A media access controller (MAC) 280 is included within the network adapter 220, is coupled to bus 216 and processes digital network signals. The MAC 280 serves as an interface between bus 216 and physical layer 282 and performs a number of functions involved in the transmission and reception of data packets. For example, during the transmission of data, the MAC 280 assembles the data to be transmitted into a packet with address and error detection fields. Conversely, during the reception of a packet, the MAC 280 disassembles the packet and performs address checking and error detection. In addition, the MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components and I/O bridges to monitor data processing system 200. Service processor 204 also executes Built-In-Self-Tests (BISTs), Basic Assurance Tests (BATs) and memory tests on all elements found by interrogating a system processor, memory controller, and I/O bridge. Any error information for failures detected during the BISTs, BATs and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within various computers or data processing systems, such as those depicted in FIG. 1 or 2. As a specific, commercially available example, a data processing system implementing an early time slice end to minimize virtual processor preemption, such as described herein below, can be built upon technologies found in IBM's z/Architecture® product line firmware and systemware, as described in the "z/Architecture® Principles of Operation", IBM Publication No. SA22-7832-09, 10th Edition, September 2012 (pages 1-1568). (IBM® and z/Architecture® are registered trademarks of International Business Machines Corporation, Armonk, N.Y., U.S.A)

The hypervisor 110 described above allows the running of multiple instances of operating systems (such as Linux, CMS, z/OS, etc) on a mainframe computer, such as the computing system 100, and does this by virtualizing a set of computer resources (CPU, memory, I/O devices) for each instance of an operating system. So from the perspective of the operating system, it appears to have real computer resources though the operating system is actually running in a virtual machine.

Such a virtual machine may have more than one virtual CPU 120, which allows the corresponding operating system to concurrently execute two or more different sets of instructions. These different sets of instructions share access to a common memory for the virtual machine. As is typical in non-virtualized environments, operating systems (and programs) which run in a multiprocessor environment with shared memory require serialization to control access to read and write certain areas of memory with one exemplary serialization technique being a spin lock.

The hypervisor 110 is responsible for, among other things, controlling access to the CPUs of the computing system 100 by the virtual CPUs 120 of the virtual machines and a system administrator may use a share setting to establish a policy for how much of the CPU resource each virtual machine should get when there are insufficient CPU resources to satisfy the needs of the virtual machines. This share setting can assign a priority to each virtual CPU 120 and set forth that each virtual CPU 120 is allowed to run for up to a certain amount of time (called the time slice, which can default to, e.g., 5 ms) before this priority is recalculated. The share setting can also be defined such that the time slice can be consumed in several discrete chunks. That is, if a virtual CPU 120 loads a wait state or becomes not runnable for some other reason, the virtual CPU 120 retains the remainder of its time slice and resumes when it again becomes ready to run. The priority assigned is a function of the share setting for the virtual machine, how much CPU the virtual CPU 120 has consumed and a time slice size.

In virtualized environments, such as those described above with reference to FIGS. 1 and 2, a spin lock is a serialization technique in which one virtual CPU (i.e., one of the virtual processors 120) acquires a lock on a location in virtual memory 122 using a serializing instruction to update the virtual memory location. All of the other virtual CPUs that wish to obtain this lock must enter into a loop waiting condition for the spin lock to enter a state where the other virtual CPUs are allowed to acquire the spin lock. While a virtual CPU holds a spin lock, the virtual CPU is permitted to read or modify other virtual memory locations without using serialization instructions. With this arrangement, multiprocessor guest use of spin locks can cause inefficient spinning if the hypervisor 110 is not currently running the virtual CPU holding the spin lock. Existing technology can use certain algorithms, e.g., SIGP sense running status (SRS), so that a virtual CPU that is spinning and waiting for the spin lock to become available can interrogate whether the virtual CPU, which holds the spin lock is currently running. If not, the program which is spinning for the spin lock can use a Diagnose x'9C' (hereinafter referred to as "Diag x'9C'") instruction to instruct the hypervisor 110 to prefer to run the virtual CPU currently holding the spin lock.

While such a solution may be effective in detecting and reacting to the problem of hypervisor 110 preempting a guest CPU (i.e., one of the virtual processors 120) that currently holds a guest lock, the solution can also lead to or cause context switches between the guest CPU and the hypervisor 110 as well as to induce overhead in the hypervisor 110. This is because the Diag x'9C' instruction requires hypervisor 110 intervention which generally requires that the hypervisor 110 acquires serialization of its own and incurs the related overhead. Thus, as described herein, the number of times the hypervisor 110 preempts a guest CPU that holds a guest lock is minimized or reduced by an added ability to declare an early time slice end for a guest CPU in cases where the guest CPU loads a wait state program status word (PSW) and less than a certain threshold of the time slice remains. Doing so, significantly reduces the number of times that a guest-lock-holding CPU is preempted and allows for more efficient guest CPU operation.

As noted above, a problem that can occur in a virtualized environment is that one virtual CPU 120 of a virtual machine might acquire a spin lock but then be preempted by the hypervisor 110 choosing to stop the virtual CPU 120 in the middle of the execution of its instructions and switch to running a different virtual CPU instead. If this happens, another virtual CPU 120 belonging to the same virtual machine as the virtual CPU 120, which was preempted while holding the spin lock, might find itself spinning for a lock which won't be released for an extended period of time due to the virtual CPU 120 that had acquired the spin lock not currently running. Therefore, the SIGP SRS and Diag x'9C' options are available for operating systems running in virtual machines to detect that this has happened and to take action to instruct the hypervisor 110 to give preference to running the virtual CPU 120 currently holding the spin lock. This synergy between the hypervisor 100 and the guest operating system has been shown to reduce unproductive spinning for spin locks and improves the performance of workloads but has an associated overhead caused by a break out of emulation mode (where the virtual CPU's instructions are being directly executed by the real CPU) and requires the hypervisor 110 to acquire global serialization. An improvement on this issue would thus involve the hypervisor 110 dispatching guest CPUs so as to reduce the number of times a guest virtual CPU determines it should use Diag x'9C'.

Here, one observation about the hypervisor 110 operation is that when a virtual CPU concludes a time slice, a new priority it receives will typically be worse than the one it previously held. This worsening of the priority, relative to other virtual CPUs which are contending for the real CPUs, means that this is a point where a virtual CPU is more likely to be preempted in order to run a different virtual CPU. By waiting to recalculate a virtual CPU's priority until it has consumed a certain amount of real CPU means that most of the time the virtual CPU will be in the middle of executing instructions unless it happens to load a wait state just as its time slice expires. In general, the hypervisor will be unaware as to whether this virtual CPU is currently holding any guest spin locks.

Meanwhile, an observation about spin lock usage is that operating systems tend to not enter wait states while holding spin locks. Therefore, if the hypervisor 110 observes a virtual CPU loading a wait state PSW, it can logically conclude that the virtual CPU is not holding any spin locks.

Figure 3:
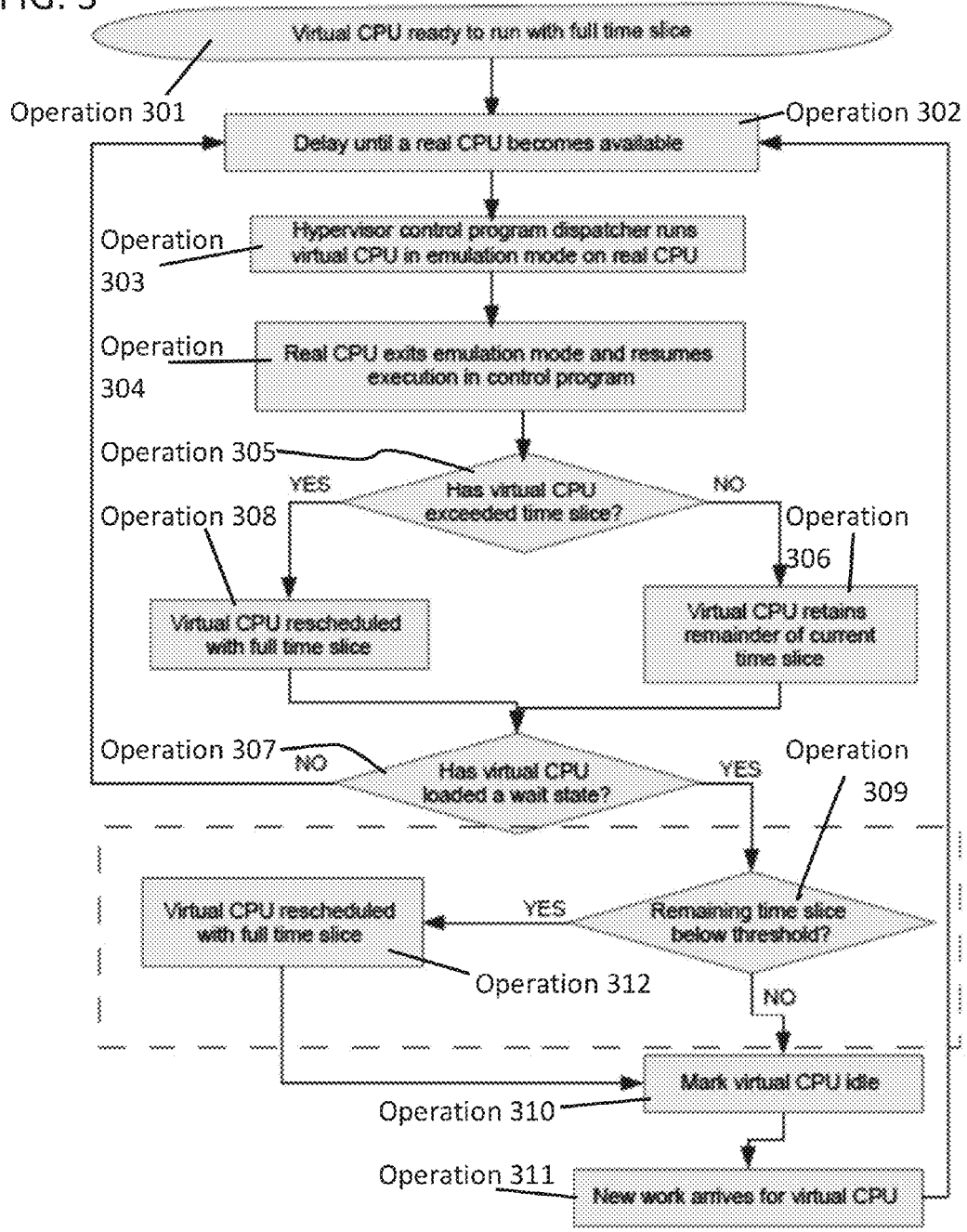
FIG. 3 is a flow diagram illustrating a method of operating a computing system in accordance with embodiments.

With reference to FIG. 3, an enhancement of the computing system 100 described above is to set a threshold where if the virtual CPU enters a wait state and has less than this threshold amount of time remaining in its time slice, then the virtual CPU will be rescheduled for a new time slice. This rescheduling takes into account the unused portion of the time slice that was ended early, so the guest is not penalized for loading a wait state. The reason a threshold is used, rather than doing this every time a virtual CPU loads a wait state is to reduce overhead if a virtual CPU were to frequently cycle between waiting and running.

Another benefit of the enhancement is that virtual CPUs that exit a wait state are guaranteed to have a certain minimum amount of time slice remaining. Prior to this invention, there were times when a virtual CPU would load a wait state with a trivial amount of time left in the time slice. Later, when that virtual CPU becomes active again, it will quickly hit time slice end (perhaps just as it has finished populating the memory cache with a significant amount of the guest's memory) and risk being preempted. By ensuring that the virtual CPU has a minimum time slice length when it exits a wait state, it will assuredly have sufficient time to take advantage of a memory cache, should it make repeated references to the same memory locations or to other locations in the same cache line with those prior references.

One consequence of the enhancement is that a virtual CPU that enters a wait state and gets a new time slice (and worse priority) may be delayed longer to access real CPU than had it not had its priority recalculated. That is, by recalculating the priority and possibly pushing it out past other competing virtual CPUs, it might now have to wait longer to receive an interrupt to wake it from wait state because we will choose to run other virtual CPUs first.

As shown in FIG. 3, the enhancement described above may be embodied as a method of operating the computing system 100. The method begins with a virtual CPU being ready to run with a full time slice at operation 301 and the virtual CPU being delayed at operation 302 until a real CPU becomes available. Once the real CPU becomes available, at operation 303, a control program dispatcher of the hypervisor 110 runs the virtual CPU in emulation mode on the real CPU until the real CPU exits emulation mode and resumes execution in a control program at operation 304.

Next, at operation 305, a first determination is made as to whether or not the virtual CPU has exceeded its time slice. In an event that the virtual CPU has not exceeded its time slice, control proceeds to operation 306 at which point the virtual CPU retains the remainder of its current time slice with control then proceeding to operation 307. At operation 307, a second determination is made as to whether the virtual CPU loaded a wait state. Conversely, in an event that the virtual CPU has exceeded its time slice, control proceeds to operation 308 at which point the virtual CPU is rescheduled with a full time slice with control then proceeding to operation 307.

From operation 307, in an event that the virtual CPU has not loaded a wait state, control returns to operation 302 with the virtual CPU being delayed until a real CPU becomes available. However, in an event that the virtual CPU has loaded a wait state, control proceeds to operation 309 at which point a third determination is made as to whether or not the remaining time slice of the virtual CPU is below a predefined threshold (e.g., 60% of the 5 ms time slice). Here, in an event that the remaining time slice of the virtual CPU is not below the predefined threshold, the virtual CPU is marked as idle at operation 310 and control proceeds to operation 311 at which point new work arrives for the virtual CPU. However, in an event that the remaining time slice of the virtual CPU is below the predefined threshold, the virtual CPU is rescheduled with a full time slice at operation 312 before control proceeds to operation 310 and then 311. In either case, once new work arrives for the virtual CPU at operation 311, control returns to operation 302 with the virtual CPU being delayed until a real CPU becomes available.

Figure 4:
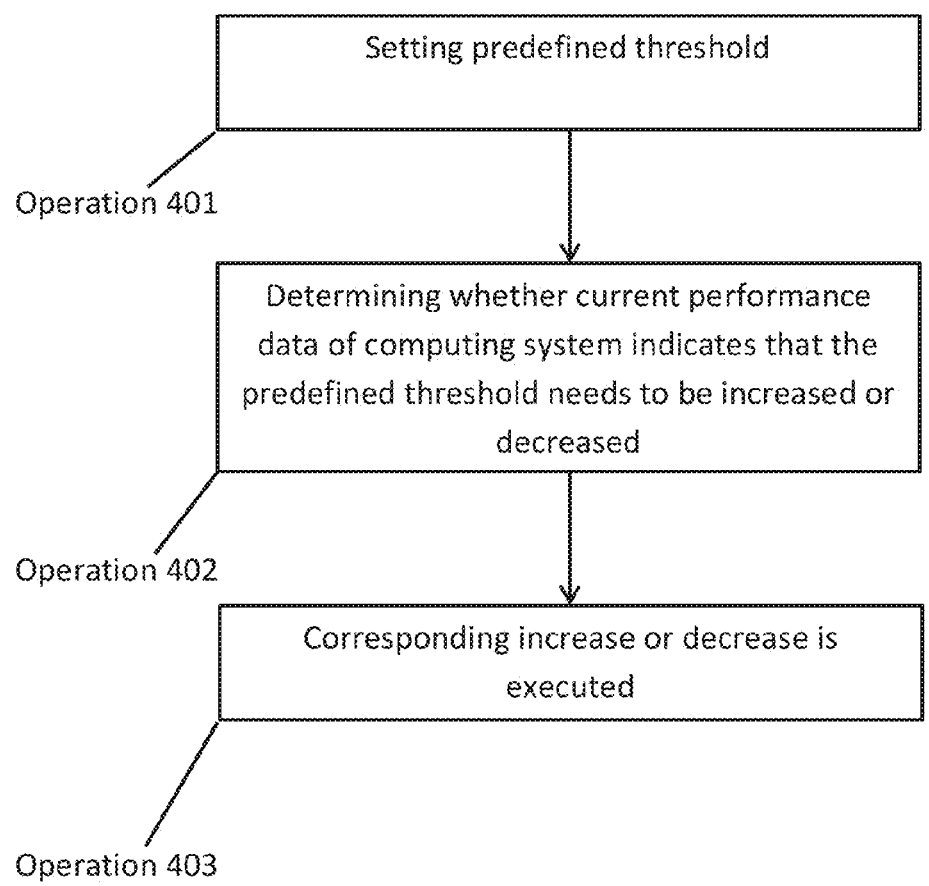
FIG. 4 is a flow diagram illustrating a method of operating a computing system in accordance with further embodiments.

In accordance with further embodiments and, with reference to FIG. 4, the predefined threshold may be set at varying selected or default levels at operation 401. Then, during the course of an operation of the computing system 100, the hypervisor 110 may determine that the predefined threshold needs to be temporarily or permanently increased or decreased based on current performance data of the computing system 100. That is, at operation 402, the hypervisor 110 determines whether current performance data of the computing system 100 indicates that the predefined threshold needs to be increased or decreased and, at operation 403, the corresponding increase or decrease is executed. Thereafter, the execution of operation 309 (see FIG. 3) is executed with respect to the new predefined threshold.

In accordance with embodiments, it will be understood that an increase in the predefined threshold may correspond to an incidence of, for example, the current performance data indicating that too many virtual CPUs are exceeding their time slice at operation 305 (see FIG. 3) rather than loading a wait-state PSW within the current threshold. By contrast, it will be understood that a decrease in the predefined threshold may correspond to an incidence of the current performance data indicating that an excess of hypervisor overhead is occurring and thus slowing down the overall computing efficiency of the computing system 100. Of course, it is to be understood that other reasons may exist as to why the thresholds may need to be increased or decreased.

Figure 5:
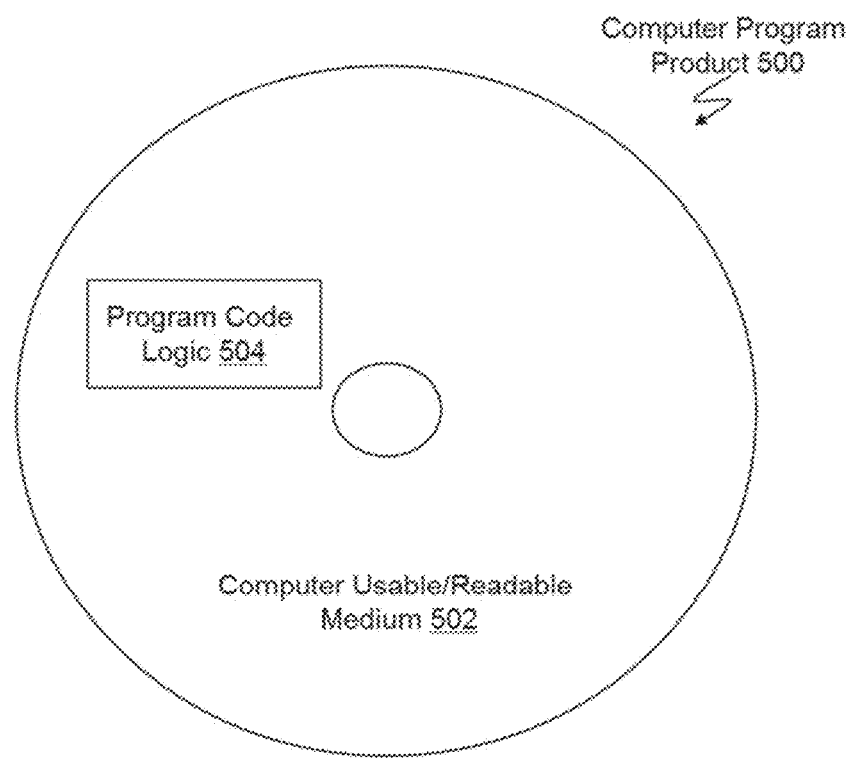
FIG. 5 is a schematic diagram illustrating a computer program product in accordance with embodiments.

With reference now to FIG. 5, a computer program product 500 is provided and includes a computer readable storage medium 502, which is not a signal, and program instructions 504 for implementing a method for reducing virtual machine preemption in a virtualized environment as described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for reducing virtual machine preemption in a virtualized environment, the method comprising:
   dispatching a virtual central processing unit (CPU) to run in an emulation mode on a real CPU until the real CPU exits the emulation mode;
   determining whether the virtual CPU has loaded a wait state;
   in an event that the virtual CPU has loaded the wait state, determining whether a remaining time slice of the virtual CPU as a result of the dispatching is below a predefined threshold provided as a time slice percentage;
   in an event the remaining time slice of the virtual CPU is not below the predefined threshold, marking the virtual CPU as being idle with the remaining time slice being retained thereby;
   in an event the remaining time slice of the virtual CPU is below the predefined threshold, rescheduling the virtual CPU with a full time slice and marking the virtual CPU as being idle with the full time slice being retained thereby;
   increasing the predefined threshold in accordance with a determination that excessive virtual CPUs are exceeding respective time slices; and
   decreasing the predefined threshold in accordance with a determination that excessive hypervisor overhead is occurring.

2. The method according to claim 1, wherein the virtual CPU has a full time slice prior to the dispatching and the dispatching comprises delaying the dispatching until the real CPU becomes available.

3. The method according to claim 1, further comprising:
   determining whether the virtual CPU exceeded a time slice during the dispatching;
   in an event that the virtual CPU exceeded the time slice during the dispatching, rescheduling the virtual CPU with a full time slice; and
   in an event that the virtual CPU did not exceed the time slice during the dispatching, having the virtual CPU retain the remainder as the remaining time slice.

4. The method according to claim 1, wherein, following the rescheduling of the virtual CPU with the full time slice, the method further comprises:
   having the virtual CPU available for new work; and
   repeating the dispatching.

5. The method according to claim 1, further comprising:
   having the virtual CPU available for new work, in an event the remaining time slice of the virtual CPU is not below the predefined threshold; and
   repeating the dispatching.

* * * * *